Nov. 9, 1937.  E. W. MILLER  2,098,428
MACHINE FOR GENERATING THROATED GEAR ELEMENTS
Filed Jan. 24, 1931　　　5 Sheets-Sheet 1
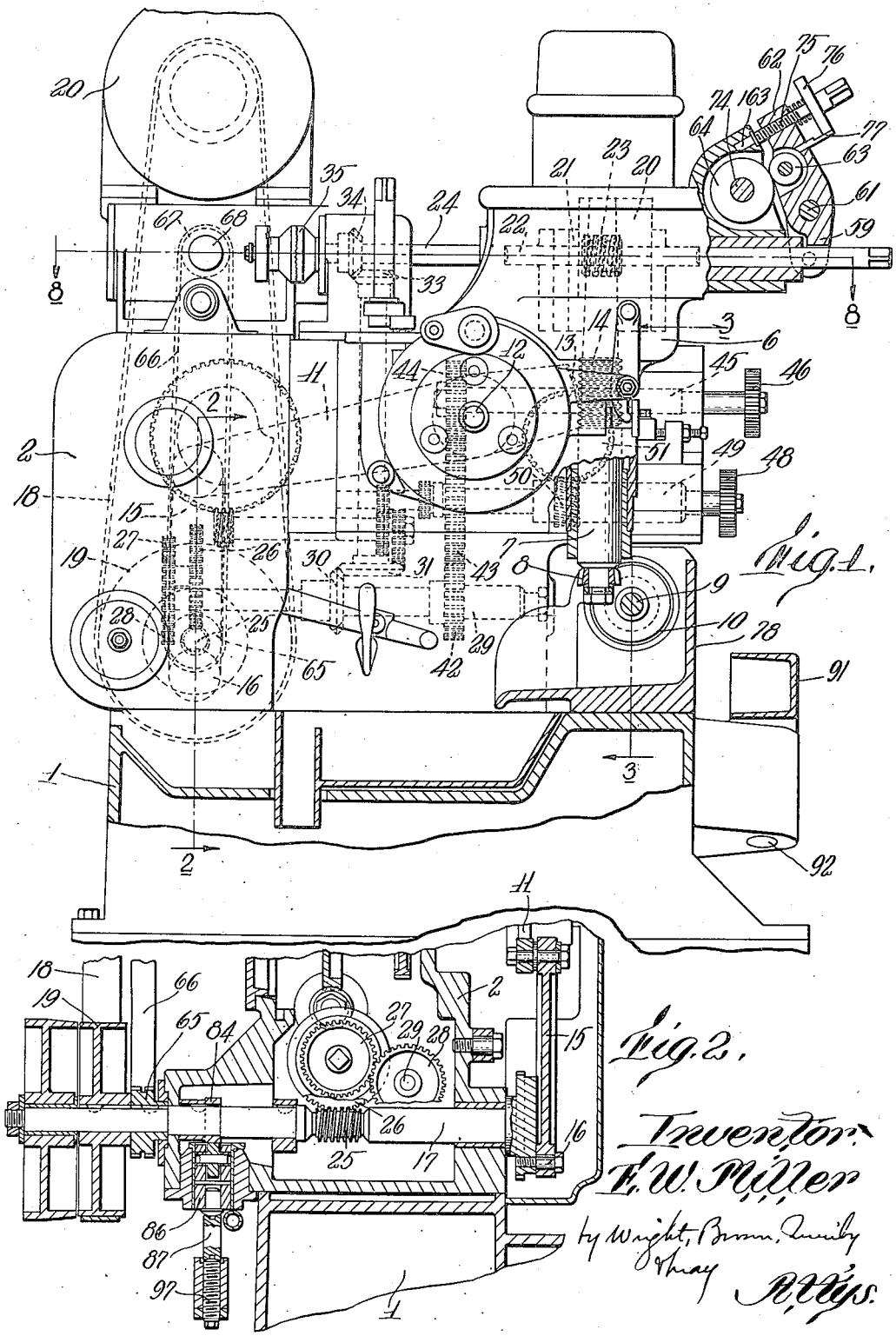

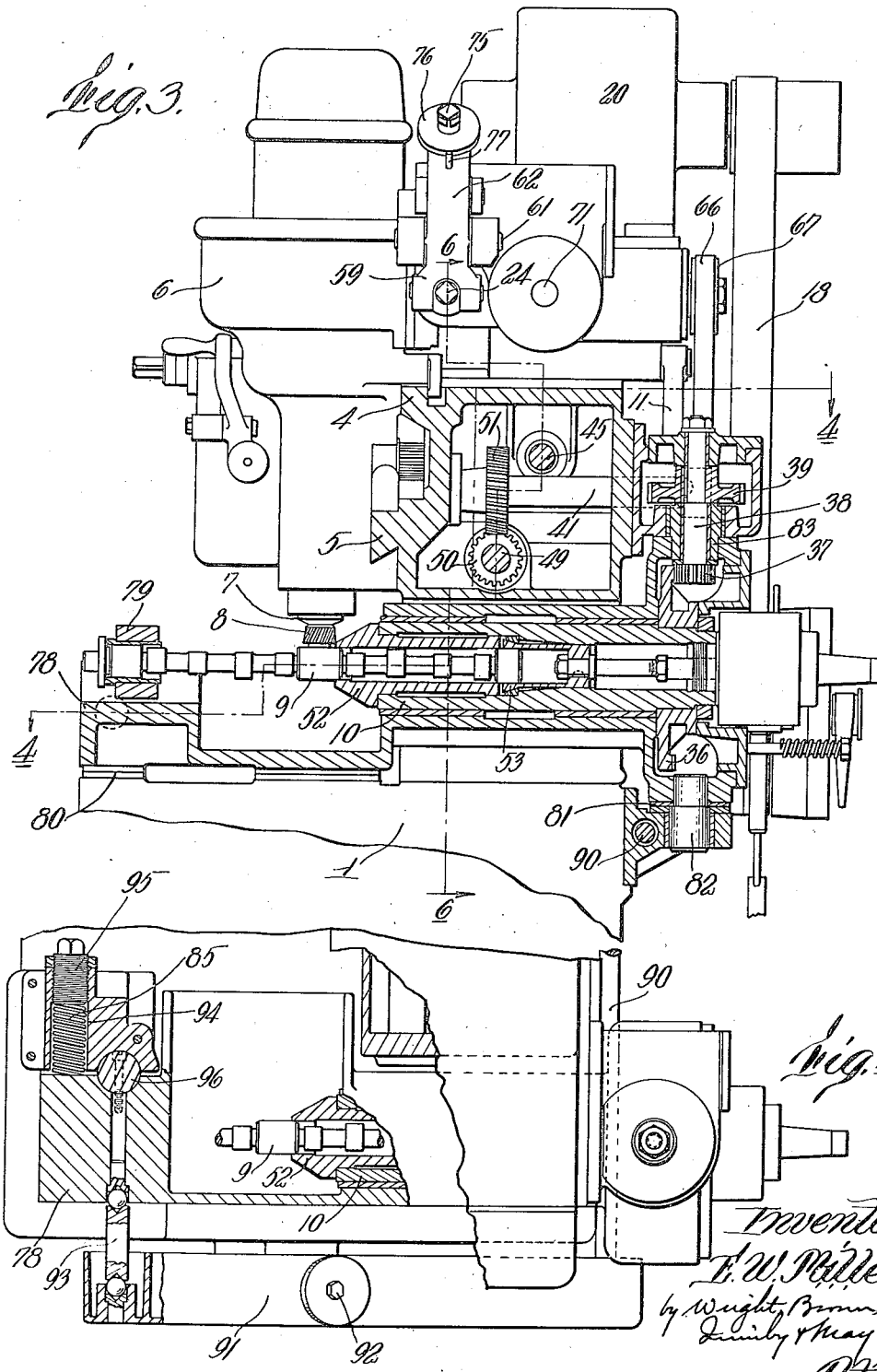

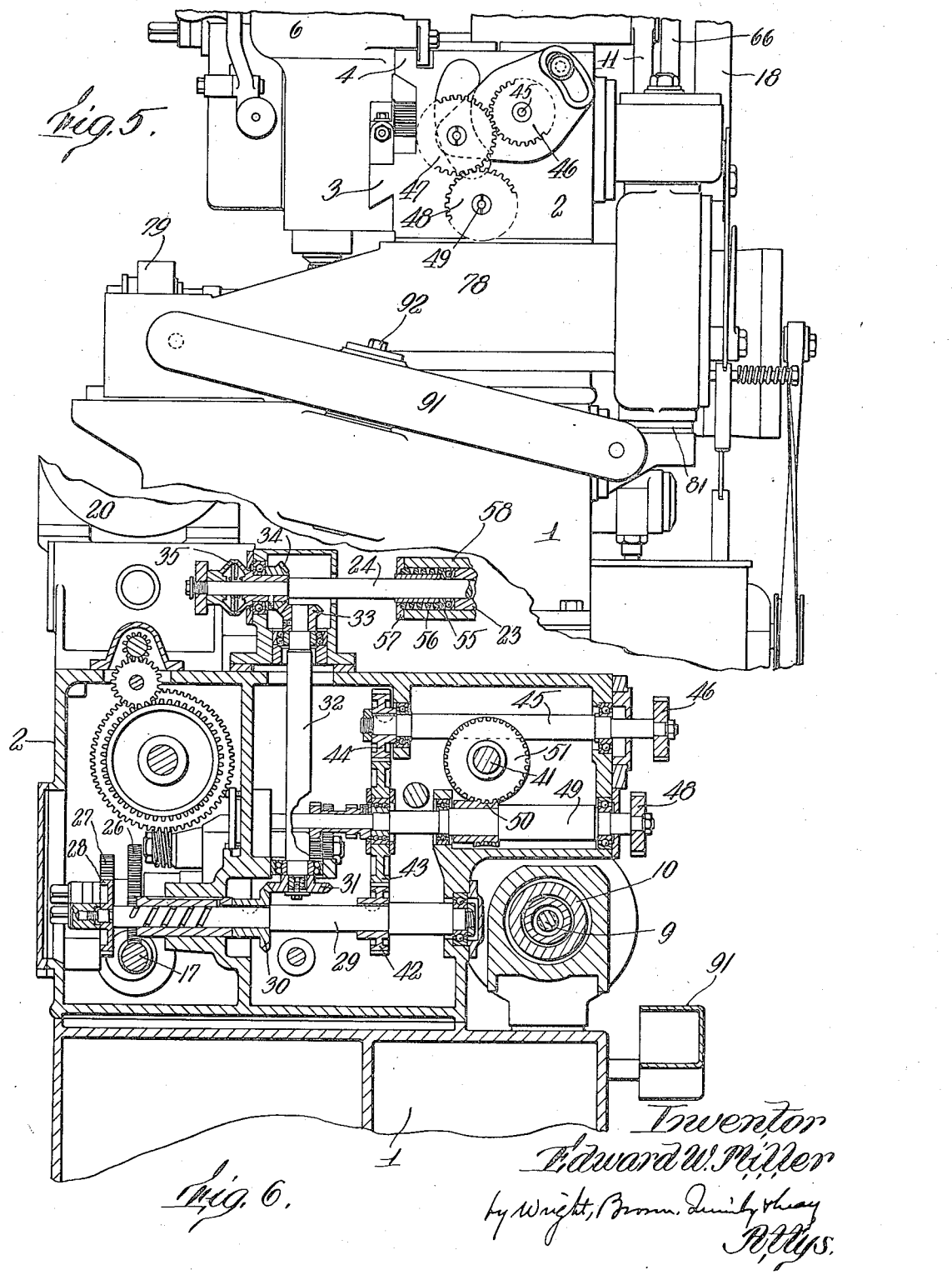

Nov. 9, 1937.   E. W. MILLER   2,098,428
MACHINE FOR GENERATING THROATED GEAR ELEMENTS
Filed Jan. 24, 1931   5 Sheets-Sheet 5

Inventor:
Edward W. Miller
by Wright, Brown, Quinby & May
Attys.

Patented Nov. 9, 1937

2,098,428

UNITED STATES PATENT OFFICE 2,098,428

MACHINE FOR GENERATING THROATED GEAR ELEMENTS

Edward W. Miller, Springfield, Vt., assignor to The Fellows Gear Shaper Company, Springfield, Vt., a corporation of Vermont Application January 24, 1931, Serial No. 510,958

6 Claims. (Cl. 90—9)

This invention has for its purpose to provide a machine adapted to generate gear elements in the nature of so-called hour glass worms or throated gears and the like. A salient characteristic of such gear elements is that, in axial planes, the teeth are arranged with a concave curvature, or at least the bottoms of the spaces or grooves between the teeth conform to such a curvature. Where the gear is deeply throated, the tops of the teeth also conform to a similar curvature; but with shallow throated gears the tops of the teeth may terminate in a straight line, axially of the gear. The teeth of such throated members have a generally helical arrangement. In this use of the term "helical", and corresponding uses of related words and expressions occurring throughout this specification, I have not intended to imply a limitation to the most specific geometrical and mechanical definition of a helix, but mean instead an arrangement and formation in which the teeth extend both circumferentially and axially of the element at the same time, with a continuous curvature.

Such throated gear elements are adapted to mesh with either helical or straight spur gears, and may have any desired number of teeth arranged with any desired helix angles, and they may be made of any desired diameter. Such a throated gear and its mating gear are arranged on non-intersecting axes which in most cases are at right angles to each other (that is, each axis is parallel to a line intersecting and perpendicular to the other axis); although this rectangular arrangement is not essential and they may be oblique or skewed to one another. Characteristic features of such throated gear or hour glass worm elements are described in my Patent No. 1,948,530, February 27, 1934, entitled Worm cutting machine.

The main object of the invention is to provide means for more accurately generating and shaping such throated members than has been accomplished heretofore. Another object is to enable such throated gears to be cut in constricted spaces between projections on the same work piece adjacent to either or both ends of the throated gear. Still another part of my object is to effect improvements over the results achieved by the machine set forth in my patent above mentioned.

In my said patent I have shown a machine by which machine elements of the type herein defined are cut by a gear shaper cutter having helical gear characteristics and rotated about its axis while the work piece is rotated about a transverse axis in the same plane with the cutting ends of the cutter teeth; the speeds of rotation of the cutter and work piece being in harmony with one another in the same ratio as those of a worm and gear running in mesh together. But after the cutter has been fed to the required depth in the work there is no further relative movement between them except that of their harmonious rotation, and an oscillative movement of the cutter about its axis when its teeth are narrower than the spaces needed to be cut in the worm. Conceiving that superior results to those accomplished by said machine are desirable and possible, I have by further study discovered and devised a mode of applying to the purposes of shaping throated gear elements the principle of generation and cutting by a planing action of the cutter. Thus the present invention, as compared with that of my prior patent, comprises the new step of reciprocating the cutter past the work piece tangentially to the latter at a relatively rapid rate, while the cutter and work are rotated slowly about their respective axes and the cutter is additionally oscillatively rotated about its axis. In this case also, when gears of steep helical pitch are to be cut, the cutter used is provided with teeth helically arranged similarly to the teeth of a helical gear (except for that modification of tooth form which is applied to all gear shaper cutters for the purpose of limiting contact with the work to the cutting edges only, and consists in convergence of the side faces of the teeth away from their cutting ends). An oscillative angular movement is then given to the cutter as a partial rotation about its axis during its cutting strokes conformably to the helix angle of its teeth, and an equal reverse rotation during return strokes. This oscillative movement is combined with a slow progressive generative rotation of both the cutter and work by which successive cuts are caused to merge into one another so as to form continuous helical teeth surrounding the work piece. But a spur gear cutter may also be used in cases where the helix angle of the work is small enough.

I have also combined with the means for effecting these motions a means for giving to the cutter incremental rotations of small extent from side to side between successive cutting strokes of an amount sufficient to compensate for disparity between the width of the tooth spaces or thread grooves required to be cut and the thickness of the cutter teeth at their operative ends.

A machine suitable for carrying the invention into effect is illustrated in the accompanying drawings, in which Fig. 1 is a front elevation of the principal portion of the machine, with certain parts broken away and shown in section;

Fig. 2 is a fragmentary vertical section on line 2—2 of Fig. 1;

Fig. 3 is in part an end elevation as seen from the right of Fig. 1 and in part a sectional view taken on line 3—3 of Figs. 1 and 7;

Fig. 4 is in part a plan view and in part a section taken on line 4—4 of Fig. 3, of the right hand end of the machine;

Fig. 5 is a partial elevation of the right hand end of the machine relative to Fig. 1;

Fig. 6 is a vertical section on line 6—6 of Fig. 3;

Like reference characters designate the same parts wherever they occur in all the figures.

Figure 7:
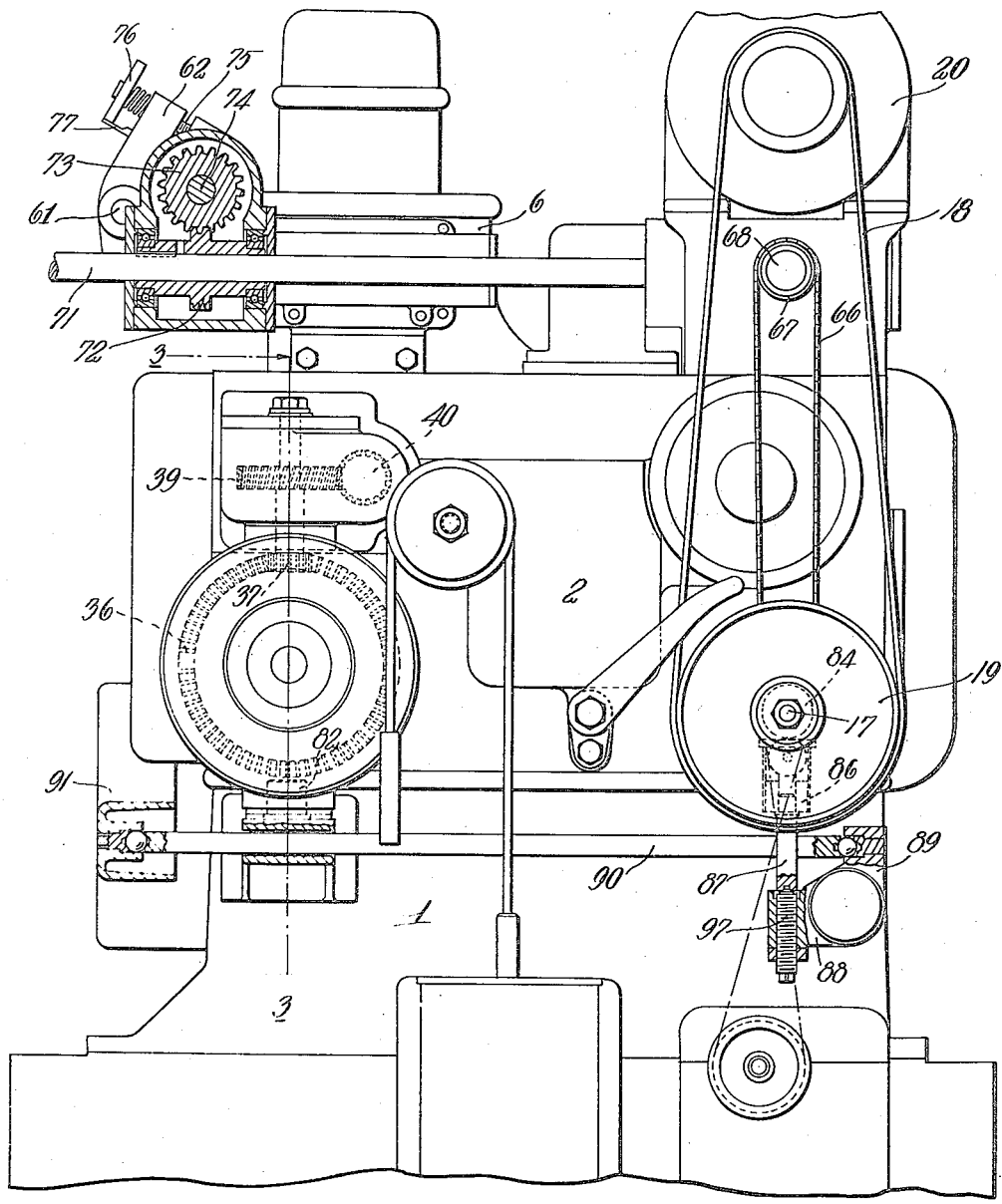
Fig. 7 is a rear elevation of the machine.
Figure 8:
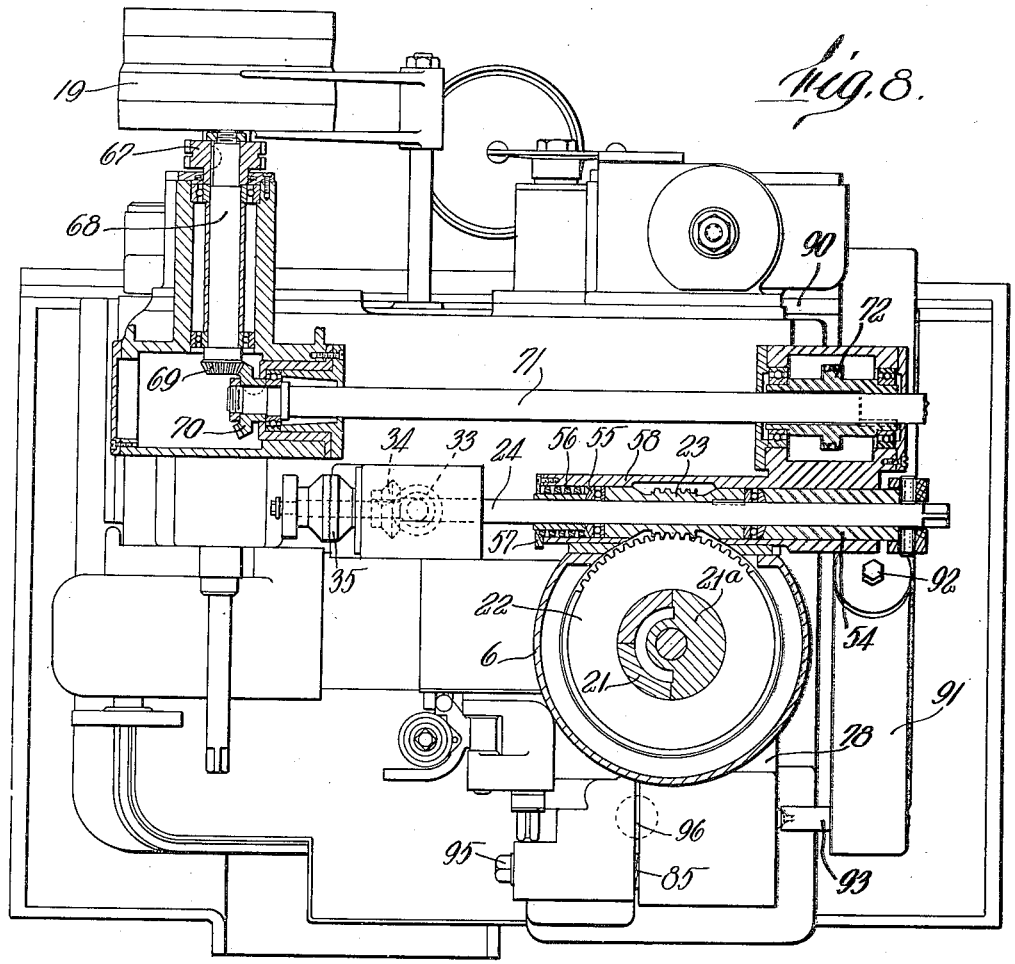
Fig. 8 is a horizontal section on line 8—8 of Fig. 1.
Figure 9:
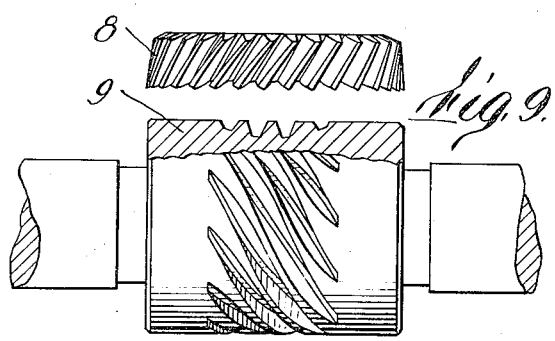
Fig. 9 is an elevation showing the nature of the work to be done, and the cutter used for forming the work, in this machine.

The machine comprises a base 1 and superstructure 2 of any suitable character, the latter being provided with guideways 4 and 5 on which a saddle or cutter carriage 6 is adapted to move horizontally. The carriage 6 is provided with a vertical guideway in which is reciprocatably and rotatably mounted a cutter spindle 7 carrying a gear shaper cutter 8.

The work piece 9 is carried by a work spindle 10 which is mounted and arranged to rotate about a horizontal axis at one side of the axis of the cutter spindle. A wide variety of work pieces may be operated on in a machine of this character, wherefore the specific work piece here shown, which is the cam shaft of an automobile engine in which a helical gear is to be cut in the middle part, must be understood as being illustrative of the character and not limiting as to the scope of the invention.

The cutter spindle is given a rapid reciprocation lengthwise by a crank and lever mechanism shown dotted in Fig. 1 and in section in Fig. 2. A lever 11 is pivoted on a center 12 to oscillate in a vertical plane and is provided with a gear segment 13 on one arm which meshes with encircling rack teeth 14 on the spindle. The arm of the lever at the opposite side of the pivot is connected by a link 15 with a crank pin 16 on a main shaft 17 which is driven by a belt 18 and pulley 19 from a motor 20. As the spindle reciprocates it is given an oscillative movement of rotation by complemental guides 21 and 21a (Fig. 3), one of which is secured to the spindle and the other to an encircling worm wheel 22. These guides have complemental helical faces, the pitch or helix angle of which is the same as that of the cutter teeth. There is also a depth feed mechanism which moves the cutter carriage slowly toward the axis of the work until cuts of the prescribed depth have been made, causes the carriage to remain in the advanced position until the cutting operation has been completed, and backs it off automatically at the end of the operation. As the depth feeding mechanism and spindle rotating means do not involve anything novel with the present invention but conform substantially with the means for these purposes disclosed in the prior patent to Edwin R. Fellows, 1,478,472, December 25, 1923, when equipped with helical spindle guides such as are shown in the earlier Fellows Patent No. 676,227, June 11, 1901, it is unnecessary to describe them in detail in this specification, and they are merely indicated in the drawings.

While a rapid endwise reciprocation with partial rotation is imparted to the cutter, a slow generative rotation is imparted simultaneously to the cutter spindle and work spindle in such fashion that the inclined cuts made in the side of the work piece are integrated and progressively extended in a continuous helix, or a plurality of concurrent helices, with smooth faces entirely around the work.

For so rotating the cutter spindle the worm wheel 22, which is coupled thereto as previously described, is continuously rotated and transmits rotation to the spindle progressively in the same direction through the guide members 20 and 21. A worm 23 meshes with worm wheel 22 and is splined to a shaft 24 whereby rotation is transmitted to it by the latter. Rotation is imparted to shaft 24 from main shaft 17 by the following train; worm 25 (Fig. 2), worm wheel 26, spur gears 27 and 28, shaft 29 (Fig. 6), bevel gears 30, 31, upright shaft 32 and bevel gears 33, 34. Bevel gear 34 loosely surrounds shaft 24 and is coupled to it by a clutch 35, release of which permits the shaft to be independently rotated by a wrench applied to its outer end, whereby to locate the cutter angularly.

For rotating the work spindle a crown gear 36 is mounted on its rear end (Fig. 3) and meshes with a spur gear 37 on an upright shaft 38 on which there is also a helical gear 39 meshing with a helical gear 40 (Fig. 7) on a horizontal shaft 41. Shaft 41 is driven from shaft 29 through the following train:—gear 42, idler gear 43, gear 44, shaft 45, change gears 46, 47 (see also Fig. 5) and 48, shaft 49 and helical gears 50 and 51, the last named gear being on shaft 41.

It is important that the cutter used for doing this work be identical in size with the helicoidal gear with which the throated element, or hour glass worm, being cut in the machine is designed to cooperate. A considerable range of adjustment, permitting substitutions of different classes of work and appropriate cutters, is made possible by the adjustability of the cutter carriage and its depth feed mechanism, by the changeable gearing in the work spindle driving train, and by substitution of different work holding chucks in the work spindle. The particular chuck or work centering sleeve 52 and gripping jaws 53 shown in these drawings are evidently interchangeable with others of different character.

In cases where a straight spur gear cutter is used, the oscillative rotation of the cutter spindle is omitted, and straight spindle guides substituted for the helical guides 20 and 21 previously described, as explained by the Fellows patents previously referred to. Otherwise the movements given to the straight spur cutter are exactly the same as those given to the helical cutter. Many throated gears in which the helical deviation of the teeth from a plane perpendicular to the axis is relatively small may be generated in this way by straight spur cutters.

It is also important that the center distance between the cutter and work, when the former has been fully fed inward to the cutting depth, be maintained constant with the same cutter throughout the entire useful life of the cutter. By center distance in this connection I mean the distance between the axes of the two spindles, on the straight line perpendicular to both. Owing to the fact that the tooth faces of the cutters of this character are made with an inward slope or inclination from their cutting ends, in order to give necessary cutting clearance, and are sharpened by grinding off their end faces, such teeth eventually become thinner after extended service. In order to compensate for such thinning and maintain the full width of the tooth spaces cut in the work, without shortening the center distance, I have provided means for giving an incremental movement of rotation to the cutter spindle, through a small angle, alternately in opposite directions, in addition to the progressive generative rotation and the helix angle oscillation previously described. By so doing, the correct form is maintained in the faces of the threads or teeth being cut in the work. It should be noted here that the face curves of the cutter teeth are involute curves, and that the cutting edges remain true involutes of the same base circle after grinding, notwithstanding that the edges of each tooth recede toward one another and toward the base circle after grinding. But the effect of compensating for such thinning of the teeth by shortening the center distance is to change considerably the form of the tooth spaces cut in the work; hence the importance of maintaining the center distance constant and compensating otherwise for the change in cutter tooth dimensions. The incremental movement which effects such compensation with a constant center distance is effected according to my invention by moving the worm 23 endwise along the shaft 24, whereby the worm acts as a rack and imparts angular movement to the worm wheel 22. It is for this reason, as well as in order to move with the saddle 6 when the latter is shifted, that the worm is splined to the shaft, as previously described, whereby it is enabled to move independently endwise. The worm body is embraced between a sleeve 54 at one end and a spring thrust abutment 55 at the other end, acted on by a spring 56 which reacts on a plate 57 secured to a part of the work carriage structure which forms the worm housing 58. Sleeve 54 is slidable on shaft 24 and bears at its outer end on the branches of a forked lever arm 59 which is coupled by a pivot pin 61 with a part of the cutter carriage structure, and the other arm 62 of which carries an anti-friction roll 63 bearing on the circumference of a cam 64. The pressure exerted by spring 56 causes the cam follower portion of this lever to bear constantly on the cam and follow up receding portions of its surface.

The cam is rotated by a transmission train from the shaft 17, comprising a sprocket 65, sprocket chain 66, sprocket 67, shaft 68, bevel gears 69, 70, shaft 71, helical gear 72 thereon and complemental helical gear 73 on the shaft 74 of the cam. The cam is provided with high and low dwells at opposite sides of its center, intermediate dwells of approximately equal radius at opposite sides of the center between the high and low dwells, and rises and descends between the terminations of these dwells. The value of the transmission train which drives it is such as to cause it to make one complete rotation while the cutter spindle makes two endwise movements in each direction. An adjustable stop screw 75 carried by the lever arm 62 and adapted to bear on a fixed abutment 63 in the housing, enables the movement of the cam follower to be adjusted at any amount between zero and the full drop of the cam. A graduated index dial 76 and stationary pointer 77 predetermine the incremental movement given to the cutter by this means.

When a cutter having teeth of full width is used, the stop 75 is adjusted so as to permit no incremental rotation being imparted to the cutter. But when the cutter teeth have become appreciably thinner, the stop 75 is withdrawn the right distance to permit sufficient compensating incremental rotation of the cutter. Taking any cycle of four strokes, during one cutting stroke, the high point of the cam holds the worm at one limit of endwise movement. Thus the cutter teeth then coming into action are caused to act at one side only, all on correspondingly the same side however. When the cutter makes its following return stroke, the cam has turned far enough to bring an intermediate dwell beside the cam follower, which permits shifting of the cutter angularly far enough to relieve the previously active side of its teeth from the work, but not enough to cause the opposite side to drag against the work. On the third stroke of the cycle, which is a cutting stroke, the low dwell of the cam has advanced to a position permitting the relatively opposite sides of the cutter teeth to act on the work, while the previously active sides or edges are withdrawn. And on the fourth stroke, or second return stroke, the next intermediate dwell relieves the cutting edges from contact of the work. Finally with the beginning of the next cycle, the high side of the cam again takes effect. As the cutter teeth are further thinned by sharpening, the follower stop is further withdrawn in compensation. These incremental movements not only compensate for thinning of the teeth, but they also provide for relief of the side edges of the cutter on the return strokes.

In order to provide relief on the return strokes of cutters having full width teeth, as well as to relieve the tips of cutter teeth of any width, the work support is backed off slightly after, and returned to position before, each cutting stroke. Such work support comprises, in addition to the spindle 10, an apron 78, in which the spindle, and an auxiliary support 79 for such special work pieces as the one here illustrated, have their bearings. The apron rests on the machine base on horizontal plane bearing surfaces at 80 and 81, and is coupled to the base and superstructure of the frame by axially alined pivots 82 and 83. The latter pivot is tubular and provides a bearing for the shaft 38 previously described. The common axis of these pivots is vertical and intersects the axis of the work spindle. A cam 84 on the main shaft 17 (Fig. 2) and a spring 85 (Fig. 4) cooperate in giving movements to the apron. The cam acts through a vertically sliding plunger 86, transmission bar 87, bell crank lever 88—89 (Fig. 7), transmission rod 90, lever 91 pivoted to the base on an inclined axle stud 92 (Fig. 5) and transmission thrust bar 93 (Fig. 4). The spring is located in a socket 94 in a boss which rises from the base adjacent to the apron, and is confined between the apron and an adjustable abutment screw 95; being arranged so that it tends to move the work away from the cutter. The thrust transmission mechanism from the cam acts on the apron in a line approximately parallel and near to the thrust line of the spring, and in the opposite direction to the latter. It forces an abutment block 96, which is secured to the apron, firmly into a recess in the before mentioned boss. Ball and socket joints are provided between the several levers and thrust rods to compensate for their changing angularity. These members are maintained in close engagement with each other by the spring 85. In order to insure a sufficiently firm pressure of the apron against the boss on which it bears during cutting strokes, the bell crank lever arm 88 is provided with an adjustable screw 97 to take the thrust of transmission rod 87.

The cam which thus controls the apron, being on the same shaft with the crank which reciprocates the cutter spindle, rotates once with each cutting and return stroke and has a single high dwell and a single low dwell, each subtending nearly 180° and arranged so that the high dwell acts during the whole time that the cutter is in action upon the work during each cutting stroke.

The manner and sequence of operation of the machine will be apparent from the foregoing description without further explanation. It may be noted, however, that the cutter passes the horizontal plane of the axis of the work from a location at one side of such plane where it is clear of the work, to a location at the opposite side of said plane also clear of the work, and that in traversing the work it is given a motion of rotation about its axis in harmony with the helix angle of its teeth, plus a much smaller angle of rotation, in the same or the opposite direction, simultaneously with a corresponding angular rotation of the work piece, which effects the rotary feed. By reason of such additional rotation, carried out continuously throughout the entire cycle of operations, the threads or helical teeth are completed in the work after one complete rotation of the latter following the depth feed of the cutter. The incremental oscillative rotation, compensatory for thinning of the cutter teeth, is additional to the helical oscillation and feeding rotation of the cutter.

The cutting action performed thus by axial strokes of the cutter produces a different form of tooth or thread in the work than is produced when a cutter is rotated in the manner of a worm wheel in mesh with a worm, without axial traverse and with its cutting edges in the same plane as the axis of the work. It produces teeth in the work which have true involute faces in sections perpendicular to their axis and avoids the non-completion which is sometimes incident to the use of a non-reciprocating cutter. As there is no endwise movement of the work piece, nor any displacement of the cutter axially of the work piece, during the cycle of the machine, the bottoms of the tooth spaces cut in the work piece are indentical, in the axial planes of the work, with the arc of a circle having the same radius as the outside circumference of the cutter, and the teeth of the work piece are therefore given an alinement in the same plane on a concave pitch line which is the same as the pitch line of the cutter teeth. Thus the finished work satisfies the conditions of a throated gear element. Such element may be concave on its outer circumference as well, and if so made its teeth are cut to a relatively greater depth toward the axis and extend over a relatively greater arc of longitudinal pitch line circumference. But the essentials of a throated gear member exist even though the outer points of the teeth conform to a cylindrical surface, as in the illustration here given, provided the bottoms of the spaces lie along a concave curvature.

While in the foregoing specification I have used the word "teeth" in the plural number when referring to the effect produced on the work, and have shown by way of illustration the work accomplished a throated gear having a multiplicity of teeth, I wish to make it understood that the invention is not limited to cases in which the teeth are disposed in a plurality of helices rather than in a single helix. That is, the limiting case is that of a work piece having a single helix disposed around its circumference somewhat like the thread of a single threaded worm, and where such a helix makes a small angle with planes perpendicular to the axis of the work piece, it may be generated in a machine having the principles here disclosed with the use of a cutter having a very slight helix angle, or even a cutter designed to generate straight spur gears; the machine, of course, being adjusted for the particular work piece by substitution of suitable guides 21 and 21a, and otherwise in a manner apparent from the foregoing description. Thus the terms herein used as descriptive of the work produced and of the cutter used in producing it are to be construed generically and broadly to include the limiting case last described, as well as cases where work pieces having any other number of teeth or ribs of any other helix angles are produced. As referring to the cutter, the helix angle may be considered as of any value from zero to the maximum, and as to the work piece having a single helix or helical rib, such rib may be considered as composed of a number of teeth merging together.

In referring to certain parts of the machine as vertical and others as horizontal in the foregoing description, I have done so descriptively with reference to the particular embodiment of the machine here illustrated, and in the interest of conciseness, but without intent to limit the invention to machines having these and no other relationship to the horizon. It will be understood that the new features of the invention may be embodied in various other arrangements.

What I claim and desire to secure by Letters Patent is:

1. A machine for generating throated helical gear elements which comprises a work spindle, a cutter spindle, means for supporting said spindles rotatably with their axes non-intersecting and transverse to one another, means for effecting relative reciprocation between said spindles in the direction of the axis of the cutter spindle whereby a gear shaper cutter carried by the latter spindle is caused to pass endwise across the side of a work piece carried by the work spindle and make transverse cuts therein, means for simultaneously rotating the spindles about their respective axes at speeds such as to cause a generative progression of the cuts formed in the work piece, and means for incrementally oscillating the cutter spindle in timed relation with said reciprocative movements such as to cause action alternately at opposite sides of the cutter teeth during alternate cutting strokes.

2. A gear shaping machine comprising a vertically reciprocative cutter spindle, a work holding apron, a horizontal spindle mounted in said apron to rotate about a horizontal axis at one side of the axis of the cutter spindle, the apron being pivoted on a vertical axis intersecting the work spindle axis at a distance from the cutter spindle, and means for swinging said apron about its pivot so that the work piece is backed off from the cutter when return strokes of the latter occur and is held in operative position when cutting strokes are performed.

3. In a gear shaping machine of the character described, an apron, a work spindle rotatably mounted in said apron, pivot trunnions in engagement with the apron on opposite sides of said work spindle and alined on an axis intersecting the axis of the spindle, means for moving the apron back and forth about the axis of said pivot trunnions, and gearing for rotating the spindle comprising meshing gear elements, one of which is secured to the spindle and the other is rotatably mounted coaxial with said pivot axis.

4. In a gear shaping machine of the character described, an apron, a work spindle rotatably mounted in said apron, pivot trunnions engaged with the apron on opposite sides of said work spindle and alined on an axis intersecting the axis of the spindle, means for moving the apron back and forth about said pivot trunnions, and gearing for rotating the spindle comprising a shaft passing through one of the pivots and journaled coaxially therein, a gear element on said shaft and an intermeshing gear element secured to the work spindle.

5. A throated-gear shaping machine comprising a supporting structure, a cutter spindle mounted on said structure with provisions for rotation about its axis and reciprocation in the direction of its axis, a gear-like cutter carried by said spindle, a work spindle rotatably mounted on said supporting structure with its axis transverse to and at one side of the cutter spindle axis and in a position such as to hold a work piece with one side thereof extending across the paths of the teeth at the nearer side of the cutter, means for reciprocating the cutter spindle with a twisting motion such as to carry the cutter teeth back and forth in helical paths, means for imparting a progressive slow rotation to both spindles about their respective axes at relative speeds such that the cutter is caused to generate helical grooves and teeth in the sides of such work piece, and means for effecting incremental oscillation of the cutter alternately in opposite directions between successive cutting strokes so as to cause cutting first at one side and then at the opposite side of its teeth.

6. A throated-gear shaping machine as set forth in claim 5, in which the cutter teeth are narrower than the prescribed width of tooth spaces to be generated in the work, and the incremental oscillation of its teeth is equal to the difference between such prescribed width of the tooth spaces and the actual width of the cutter teeth on the pitch circumference of the cutter.

EDWARD W. MILLER.